(12) United States Patent
Watanabe et al.

(10) Patent No.: US 6,301,684 B1
(45) Date of Patent: *Oct. 9, 2001

(54) DATA DECODING APPARATUS AND METHOD FOR DECODING CONVOLUTION-CODED INPUT DATA

(75) Inventors: Hidekazu Watanabe, Tokyo (JP); Seiichi Izumi, Fellbach; Hamid Amir-Alikhani, Leonberg, both of (DE)

(73) Assignees: Sony Corporation, Tokyo (JP); Sony United Kingdom Limited, Weybridge (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/796,070

(22) Filed: Jan. 30, 1997

(30) Foreign Application Priority Data

Jan. 30, 1996 (GB) .................................................. 9601770

(51) Int. Cl.⁷ .............................. H03M 13/00; H03D 1/00
(52) U.S. Cl. .......................... 714/796; 375/232; 375/341
(58) Field of Search .................................. 371/43.1, 43.3, 371/43.4, 43.6, 43.7, 43.8; 375/340, 341, 229; 360/65; 714/794–796, 786, 792

(56) References Cited

U.S. PATENT DOCUMENTS

| | | | |
|---|---|---|---|
| 5,341,386 | * 8/1994 | Shimoda et al. | 714/786 |
| 5,432,820 | * 7/1995 | Sugawara et al. | 375/341 |
| 5,467,374 | * 11/1995 | Chennakeshu et al. | 375/340 |
| 5,486,956 | * 1/1996 | Urata | 360/65 |
| 5,774,504 | * 6/1998 | Huszar et al. | 375/341 |

\* cited by examiner

*Primary Examiner*—Albert Decady
*Assistant Examiner*—Shelly A Chase
(74) *Attorney, Agent, or Firm*—Frommer Lawrence & Haug, LLP.; William S. Frommer; Joe H. Shallenburger

(57) ABSTRACT

In a data decoding apparatus, the Viterbi algorithm is used in an equalizer so that the difference data between state metrics is used as reliability data with respect to the output data so as to provide the reliability data which can accurately represent the likelihood of the output data, whereby it is ensured that efficient decoding of data may be performed based on the reliability data described above.

11 Claims, 4 Drawing Sheets

DATA DECODING APPARATUS AND METHOD FOR DECODING CONVOLUTION-CODED INPUT DATA

BACKGROUND OF THE INVENTION

1. Field of the Invention

This invention relates to a data decoding apparatus, and more particularly to an improvement of digital cellular telephone system in which voice signals are coded and then transmitted or received.

2. Description of the Related Art

In a conventional digital cellular system, which is one of radio telephone systems, voice signals are encoded and the encoded signals are transmitted by means of time-division multiplexing technique so that one channel may be shared with a plurality of terminals at the same time.

A terminal used in such a system performs analog-to-digital conversion on a voice signal to produce voice data, and then performs data compression on the voice data. Furthermore, error correction codes are added to the data-compressed voice data, and then convolution encoding is performed to produce convolution-coded data. Then, from this convolution-coded data, IQ-signals are produced so as to perform GMSK modulation.

Thereby, the terminal converts the GMSK-modulated output signal into a transmission signal having a predetermined frequency and transmits it with a time slot assigned for the terminal. In this way, a terminal can transmit a voice signal to another terminal in speech communication via a base station.

A terminal may also receive voice signals via a base station from a transmitter in speech communication by receiving time slots assigned for it. In this receiving operation, the terminal performs frequency conversion on the received signal and then produces IQ signals by means of quadrature detection. From these IQ signals, the original convolution-coded data is reproduced and then convolution-decoding is carried out.

Furthermore, the terminal performs error correction on the decoded data, and demodulates it into voice data. Then, voice expansion is carried out on this voice data and it is further converted into an analog signal. In this way, the terminal can decode a voice signal sent by a transmitter in speech communication.

In digital cellular systems, as described above, after error correction codes are added, convolution encoding is performed on signals and then voice data is transmitted. This assures that voice signals can be transmitted even if communication environment becomes poor, and thus stable speech communication can be achieved.

In a digital cellular terminal of this type, a Viterbi decoding circuit may be used as a decoding circuit for performing convolution decoding so that bit error rates can be reduced and thus reliability of the decoded data can be improved.

In the Viterbi decoding technique, the degree of likelihood with respect to the transition of input data is detected from the input data which is sequentially input, and thus the most likely transition path is detected and decoding of the input data is carried out based on the detected most likely transition path, whereby accurate decoded results can be obtained even in the case where a large change in the signal level of input data occurs suddenly.

When the Viterbi decoding circuit is employed, if it is possible to detect reliability data representing how reliable each input data is, then the Viterbi decoding circuit will obtain the ability to more efficiently decode input data by making a soft decision based on this reliability data and to further reduce the bit error rate.

In this case, one possible way to obtain the reliability data is that the amplitude and phase of the received data are detected and these detected results are compared with predetermined reference values and then the difference between them is output as the reliability data to the Viterbi decoding circuit.

In digital cellular systems, a telephone terminal is often used in a car. However, in such mobile communication, the characteristics of transmission media are very poor, and large distortion occurs in received signals.

Therefore, in a terminal of this type, if the reliability data is produced simply based on information with respect to amplitude or a phase, there may occur a problem that the obtained reliability data does not represent the accurate degree of likelihood with respect to the input data.

Furthermore, it is difficult to numerically represent the reliability data from the information of the amplitude and phase even if the transmission media are under good characteristic conditions, and thus it is difficult to represent the degree of the likelihood of the input data.

One method to solve this problem is to form an equalizer by applying the Viterbi algorithm and to detect branch metric data by this equalizer so as to use this detected branch metric data as the reliability data.

In this type of terminal, I and Q signals are produced for example by means of quadrature detection, and these I and Q signals are converted into digital values so as to demodulate convolution-coded data.

In the receiving terminal, waveform-equalizing is then carried out by using the equalizer so as to compensate the data waveform of the convolution-coded data and so as to effectively prevent a fading effect and the like. The compensated convolution-coded data is then applied to a convolution decoder.

The Viterbi algorithm is applied to this equalizer and the branch metric with respect to the convolutioncoded data is produced. The branch metrics are summed for each path (each path consists of state transition paths) of the convolution-coded data so as to produce a state metric. The most likely path is detected by detecting a path which has the least state metric.

Based on the result of the path detection, the equalizer may reproduce the original data waveform of the convolution-coded data and thus may provide the data obtained by means of the most likelihood estimation. The Viterbi decoding circuit may use the branch metric corresponding to the selected path as the reliability data.

However, in the Viterbi algorithm, the branch metrics are summed so as to detect a state metric which is used as a basis to select the path. The path is selected not only based on the branch metric corresponding to the output data, but also based on the just previous state metric. Therefore, in some cases, a path is selected although the branch metric corresponding to the output data has a large value, which means that the branch metric does not accurately represent the degree of the likelihood of the output data in this case.

SUMMARY OF THE INVENTION

In view of the foregoing, an object of this invention is to provide a data decoding apparatus for decoding input data, in which the convolution-coded input data is decoded by making a soft decision on the basis of the detected reliability data which accurately represents the degree of the likelihood of the input data.

The foregoing object and other objects of this invention have been achieved by the provision of a data decoding apparatus 1 for decoding convolution-coded input data y which is input via a predetermined transmission medium, comprising: an equalizer 25, the equalizer 25 producing branch metrics BM from the input data IQ depending on characteristics of the transmission medium 23, state metrics PS being produced by summing the branch metrics BM for each of transition paths of the input data y, a transition path of the input data y being selected based on the state metrics PS, the equalizer 25 producing output data y by performing most likelihood estimation based on the selection result; a decoding circuit 26 for performing convolution decoding on the output data y; the equalizer 25 producing difference data between the state metrics PS as reliability data CF with respect to the output data y; and the equalizer 25 and the decoding circuit 26 performing convolution decoding on the output data y by making a soft decision after converting the output data y into multi-value data based on the reliability data.

Further, the equalizer 25 produces the reliability data CF as well as the output data y, after eliminating the effects of fading by compensating the input data IQ in response to a change of the characteristics of the transmission medium 23.

Further, the input data IQ is produced by converting a radio frequency incoming signal into a digital value.

Further, the input data IQ is produced by converting a reproduction signal reproduced from a given recording medium into a digital value.

Furthermore, the decoding circuit 26 is a Viterbi decoding circuit.

In a data decoding apparatus according to this invention, the difference data between the state metrics PS is used as the reliability data CF with respect to the output data so as to provide the reliability data CF which can accurately represent the likelihood of the output data y, whereby it is ensured that efficient decoding of data may be performed based on the reliability data CF.

When the reliability data CF is produced, the equalizer for eliminating the fading effect is also used to produce the reliability data CF. Thus, the entire configuration can be simplified. Furthermore, this invention may also be applied to a recording and reproducing apparatus or to a radio communication system so as to improve the reliability of the received results. The Viterbi decoding circuit may be used as the decoding circuit 26 so that the soft decision may be readily carried out.

This invention provides a data decoding apparatus wherein the Viterbi algorithm is used in an equalizer so that the difference data between state metrics is used as reliability data with respect to the output data so as to provide the reliability data which can accurately represent the likelihood of the output data, whereby it is ensured that efficient decoding of data may be performed based on the reliability data described above.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) General Configuration of Embodiment

Figure 1:
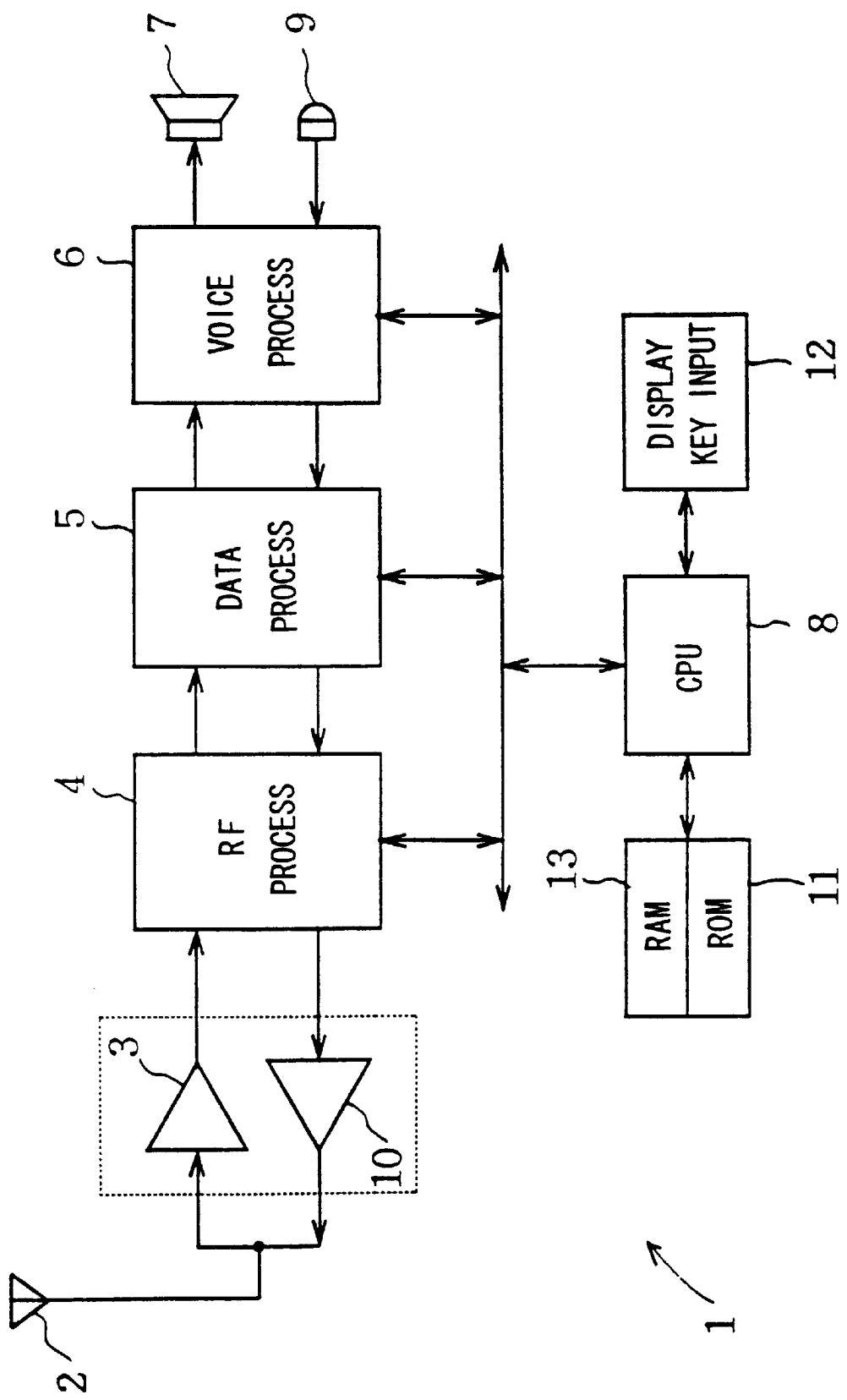
FIG. 1 is a block diagram showing a terminal of a digital cellular system, in accordance with an embodiment of this invention.

Referring to FIG. 1, 1 generally shows a digital cellular telephone terminal, wherein an antenna 2 receives a signal transmitted by a base station, and the received signal is supplied to an amplifier 3 via an antenna multicoupler (not shown).

The amplifier 3 amplifies the receiving signal by a predetermined gain and then provides it to radio frequency (RF) processing circuit 4. The RF processing circuit 4 performs frequency-conversion on the receiving signal by using a predetermined local oscillator signal. The terminal 1 can selectively receive a desired channel which is selected by changing the frequency of the local oscillator signal.

Furthermore, the RF processing circuit 4 performs quadrature detection on the frequency-converted receiving signal or demodulates the receiving signal to extract an I-signal in phase with respect to the reference phase of receiving signal and also to extract a Q-signal which is 90° out of phase with respect to that of the I-signal. These I- and Q-signals are converted into digital values by an analog-to-digital converter in the RF processing circuit 4.

In this way, the terminal 1 obtains the I-data i.e., the demodulated result in phase with respect to the reference phase of the receiving signal and the Q-data,i.e., the demodulated result which is 90° out of phase with respect to the I-data, and thus provides the IQ-data to a data processing circuit 5.

The data processing circuit 5 comprises a digital signal processor which processes the IQ-data in such a manner that the original convolution-coded data is reproduced from the IQ-data. In this processing, waveform is equalized and distortion is compensated and then the convolution-coded data is output so that effects of fading and multi-path may be reduced.

Furthermore, in this processing, the data processing circuit 5 detects a FCCH on the basis of the IQ-data and also detects a frequency error on the basis of the detected FCCH. Based on the detected frequency error, the data processing circuit 5, a required reference signal generator, and other circuits are controlled, whereby frequency deviations are corrected.

In addition to the sequence of the processing described above, the data processing circuit 5 performs convolution-decoding on the convolution-coded data and further performs error correction and then selectively provides the decoded data to a voice processing circuit 6 or a CPU 8.

The voice processing circuit 6 performs voice expansion processing on the decoded data so as to reproduce voice data. The obtained voice data is further converted into a voice signal by a digital-to-analog converter in the voice processing circuit 6. Furthermore, the voice processing circuit 6 drives a loud speaker 7 with this voice signal. In this way, the terminal 1 can accomplish speech communication by receiving a voice signal transmitted by a base station.

On the other hand, the CPU 8 extracts the information transmitted by a base station from the decoded data described above. Based on the extracted information, the frequency of the local oscillator signal is switched to a frequency corresponding to the transmitting frequency or the receiving frequency associated with a desired channel, whereby a desired voice signal can be received or transmitted on the selected channel.

On the other hand, in a transmission path of the terminal 1, a voice signal provided by a microphone 9 is converted into voice data by the voice processing circuit 6 and then voice compression is performed on the voice data.

The data processing circuit 5 adds error correction codes to the output data provided by the voice processing circuit 6 and then performs convolution encoding on this data. The data processing circuit 5 also adds error correction codes to the various control codes provided by the CPU 8 instead of adding them to the output data provided by the voice processing circuit 6, and then performs convolution encoding on these codes.

The RF processing circuit 4 performs GMSK modulation on the convolution-coded data provided by the data processing circuit 5 so as to produce a transmitting signal and furthermore converts the frequency of this transmitting signal to a predetermined frequency.

Furthermore, the RF processing circuit 4 applies the frequency-converted transmitting signal to the antenna 2 via the amplifier 10. In this way, the terminal can transmit a voice signal of a talker, a calling signal, or the like to a base station.

In this operation, the terminal 1 switches the transmitting or receiving timing according to the result of the detection of the timing by the data processing circuit 5 so that the terminal 1 selectively receives the time slots which are allocated for the terminal and so that the terminal 1 transmits the data including voice data by using these time slots allocated for the terminal by using a time-division multiplexing method.

To accomplish the operation described above, the CPU 8 allocates a work area in random access memory (RAM) 13 and executes processing program stored in read-only memory (ROM) 11 so as to provide control codes to each circuit block, whereby the operation of the entire apparatus is controlled. For example, if a key in a display and keyboard unit 12 is pressed, then in response to this pressing operation, calling signal is transmitted to a base station and if subsequently a calling signal from the base station is input to the terminal, receiving channel is switched to a proper one and other required operations are carried out.

(2) Processing on Input Data

Figure 2:
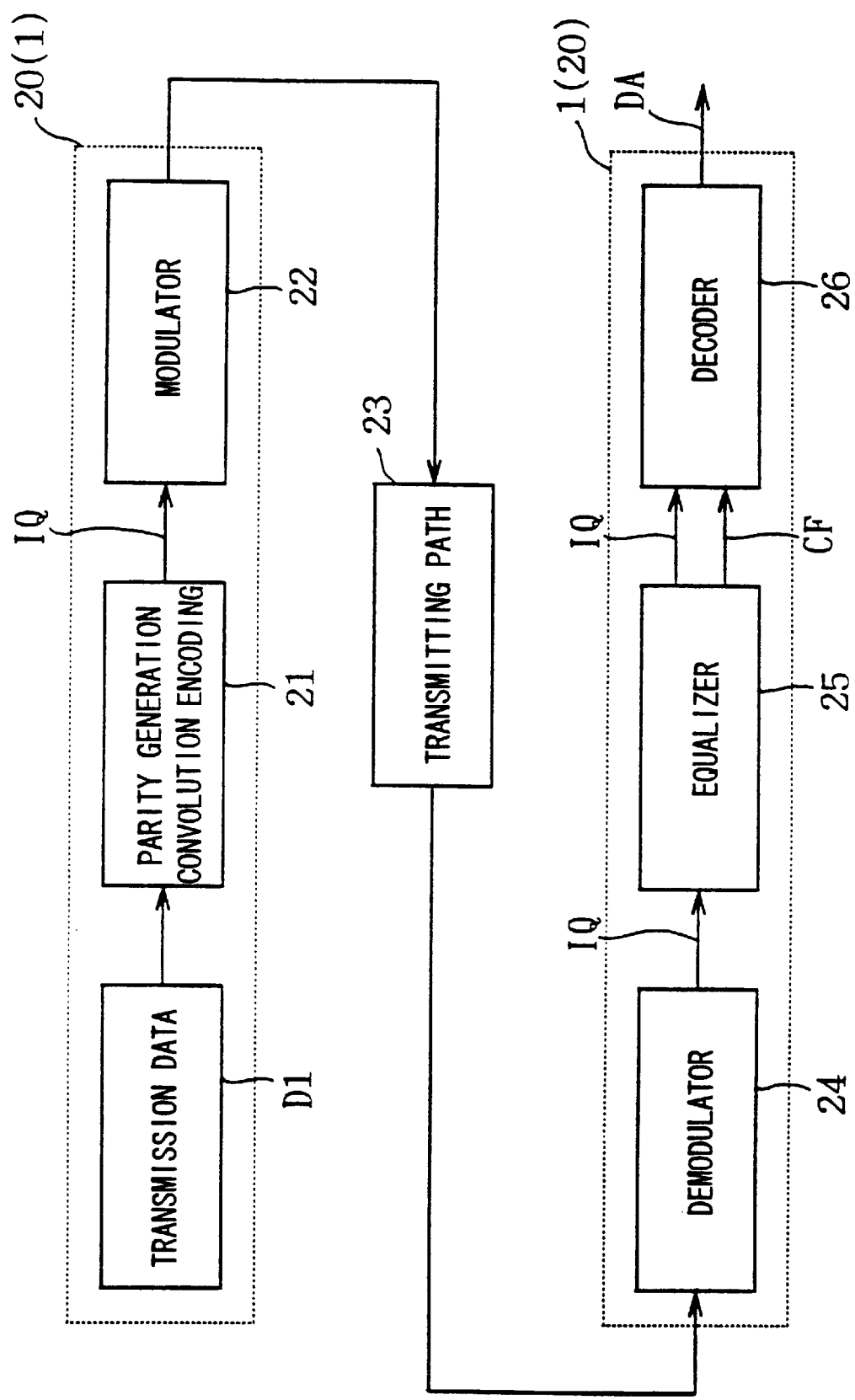
FIG. 2 is a block diagram showing data processing of the terminal shown in FIG. 1.

In the digital cellular telephone apparatus of this embodiment, voice data and other data are transmitted via processing paths as shown in FIG. 2.

In this cellular system, for respective receiving paths of the terminal 1 and a base station, corresponding transmitting paths 20 are formed in the base station and the terminal 1, respectively. In the transmitting paths 20, transmitting data D1 is provided to an encoder 21, which performs convolution encoding after adding error correction codes to the data D1.

In this convolution-encoding processing of this embodiment, the encoding ratio is set to ½, and thus in the transmitting paths 20, the encoder 21 converts the voice data and other data into convolution-coded data. Then, a modulator 22 produces two channels of I- and Q-signals and then performs GMSK modulation.

Then, in the digital cellular system, the output signal of the modulator 22 is converted to a transmitting signal by converting its frequency to a frequency corresponding to a communication channel and then the transmitting signal is transmitted via the antenna. A terminal 1 in a receiving path receives this transmitting signal transmitted via the antenna.

In digital cellular systems, the transmission is carried out via a transmission medium 23 including space which has extremely poor characteristics compared to those of other types of communication media.

In the terminal 1, the received signal is quadrature-detected by a demodulator 24, which corresponds to the RF processing circuit 4, so as to extract I- and Q-signals. Then, these I- and Q-signals are converted to digital values so as to produce an IQ data (which is a word data as obtained by directly performing analog-to-digital conversion on the I- and Q-signals).

When the IQ data is converted into convolution-coded data, an equalizer 25 which is disposed at an input stage of the data processing circuit 5, performs waveform equalization and then compensates distortion so as to reduce the fading and multi-path effects.

In this processing, the equalizer 25, which is a Viterbi equalizer in this embodiment, converts the IQ data into a convolution-coded data y by using the Viterbi algorithm.

Furthermore, in this processing, the equalizer 25 also produces the reliability data CF representing the reliability of the convolution-coded data y by using a calculation result obtained by applying the Viterbi algorithm. The equalizer 25 provides the reliability data CF as well as the convolution-coded data y to a decoder 26.

The decoder 26, which comprises a Viterbi decoder, together with the equalizer 25 forms the data processing circuit 5. The decoder 26 converts the convolution-coded data y into multi-value data according to the reliability data CF provided by the equalizer 25 and then reproduces voice data DA by applying the Viterbi algorithm, and thus the voice data is reproduced by applying a soft decision method.

The decoder 26 performs error correction on the decoded result and then output the result. In this way, the terminal 1 can reduce the bit error rate by making a soft decision on the basis of the reliability data CF and can also perform efficient decoding to extract the voice data.

(3) Equalizer

Figure 3:
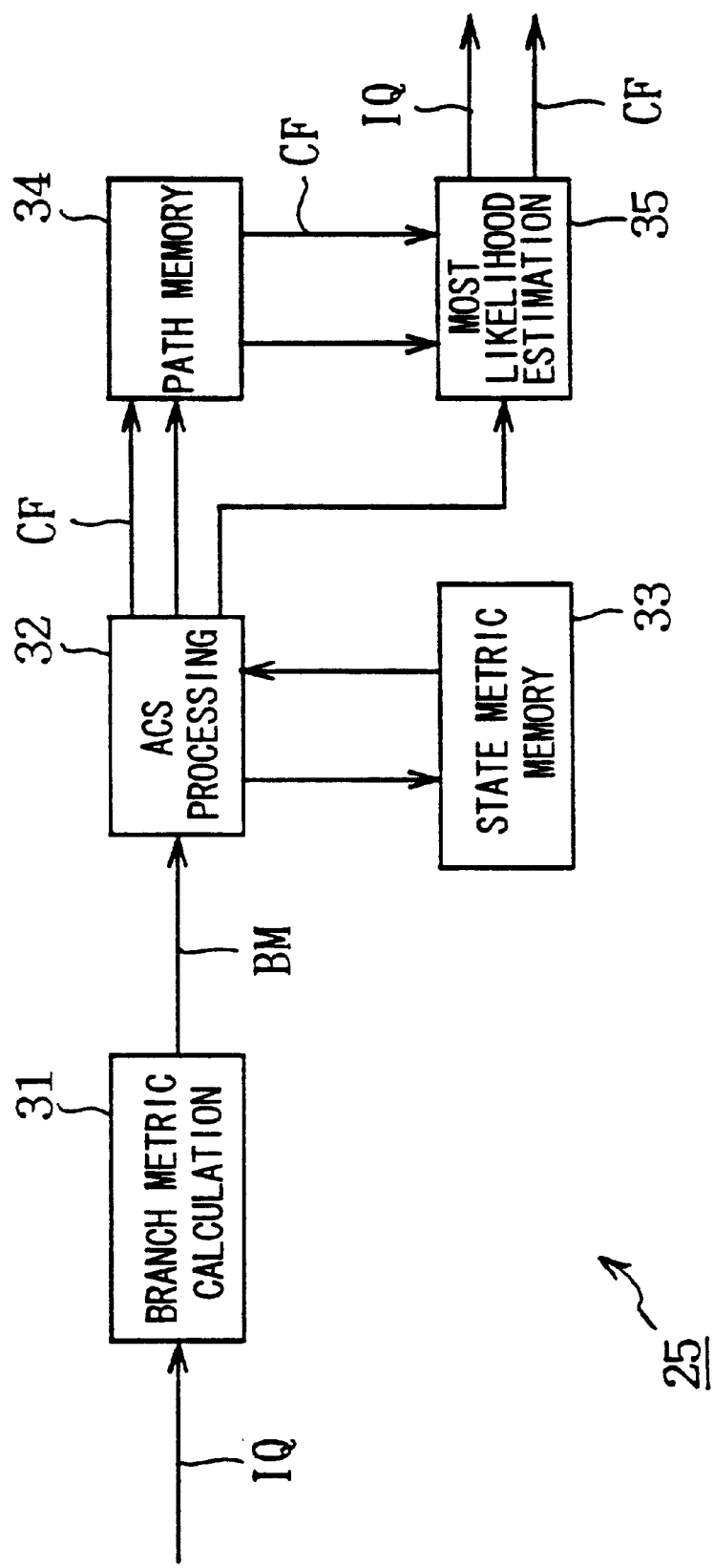
FIG. 3 is a block diagram showing an equalizer.

In the equalizer 25, as shown in FIG. 3, IQ data is supplied to a branch metric calculation circuit 31, which produces a branch metric BM from the IQ data.

An ACS (add compare select) processing circuit 32 sums the branch metrics BM for each path to produce a state metric PS and then selects a path associated with the convolution-coded data y according to the comparison result with respect to the state metrics PS.

That is, in the above processing of the digital cellular terminal 1, the number of the states of the convolution-coded data y is set to 32, and the ACS processing circuit 32 sums the branch metrics BM for each branch by summing the branch metrics BM corresponding to the 32-state metrics PS.

In this processing, the ACS processing circuit 32 detects the minimum value of the state metrics PS produced by performing summing for each path, and then selects the path corresponding to the minimum value of the state metrics PS as the most likely path.

Figure 4:
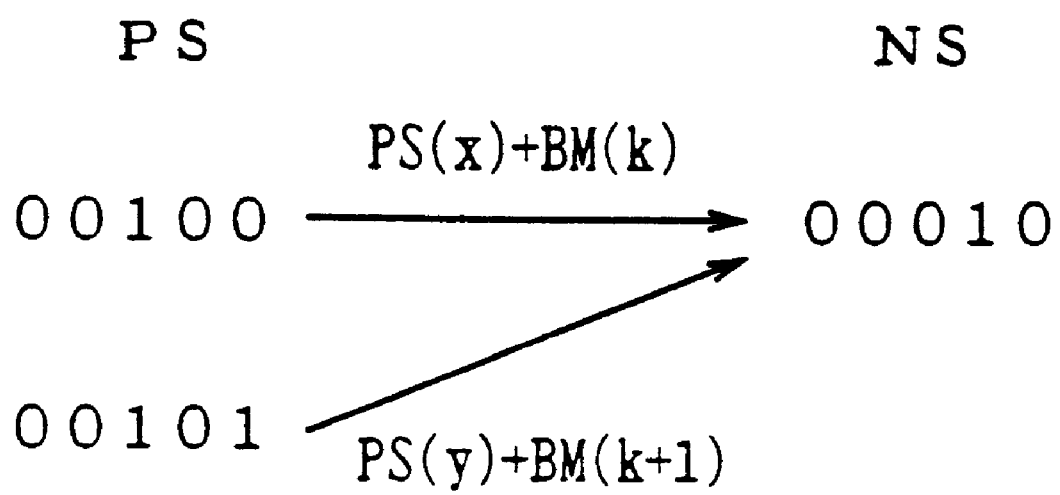
FIG. 4 is a schematic diagram illustrating the operation of the equalizer shown in FIG. 3.

Referring to FIG. 4 which illustrates a part of 32 states, there are shown two possible current states (denoted by PS), 00100 and 00101, for the case where the subsequent state (denoted by NS) has a value of 00010.

When the current state PS has a value of 00100, if 20 is detected as the state metric PS(x) and 7 is detected as the branch metric BM(k) corresponding to the state metric PS(x), the ACS processing circuit 32 employs the value of 27 obtained by adding the state metric PS(x) and the branch metric BM(k) as the state metric PS for the path from the current state PS to the subsequent state NS.

Similarly, when the current state PS has a value of 00101, if 24 is detected as the state metric PS(y) and 1 is detected as the branch metric BM(k+1) corresponding to the state metric PS(y), the ACS processing circuit 32 employs the value of 25 obtained by adding the state metric PS(y) and the branch metric BM(k+1) as the state metric PS for the path from this current state PS to the subsequent state NS.

Furthermore, the ACS processing circuit 32 compares these state metrics PS, 27 and 25, and selects the path from the current state PS with the value of 00101 to the subsequent state NS as the most likely path. Then, the ACS processing circuit 32 employs the state metric PS with the value of 25 as the state metric PS of the subsequent state NS.

In this case, the ACS processing circuit 32 calculates the following equation:

$$NS(i)=Min(PS(x)+BM(k), PS(y)+BM(k+1)) \qquad (1)$$

According to the result of the above calculation, the setting of the state metric PS of the subsequent state NS is carried out.

In this way, the ACS processing circuit 32 detects the state metric PS for each of 32 current states and stores the detected state metric PS in state metric memory 33.

Furthermore, the ACS processing circuit 32 detects the state metric PS for each of the subsequent 32states with respect to the state metrics PS stored in the state metric memory 33, whereby the most likely path is detected and the detected result is stored in path memory 34.

In this processing, the ACS circuit 32 detects the absolute value of the difference between the state metrics PS of corresponding states (i.e., the difference between the state metrics of the state transition) according to the following equation (2) corresponding to the equation (1):

$$CF=|(PS(x)+BM(k)-(PS(y)+BM(k+1))| \qquad (2)$$

The obtained absolute value is output as the reliability data. Thus, with the above arrangement, if the reliability data CF has a larger value, then it represents higher reliability. For example, in the case of FIG. 4, the reliability data CF has a value of 2.

In this way, the equalizer 25 stores the path selection result for each state in the path memory 34 and also stores the corresponding reliability data CF in the path memory 34. Furthermore, in the equalizer 25, a most likelihood decision circuit 35 sets a logic level of the convolution-coded data y according to the path selection result stored in the path memory 34, and then provides it as well as the corresponding reliability data CF to the succeeding decoder 26.

Thus, the absolute value of the difference between these state metrics PS can be readily produced by using the calculation result obtained when the path selection is carried out according to the Viterbi algorithm. As a result, the equalizer 25 can readily produce the reliability data, which leads to a reduction in overall power dissipation of the terminal apparatus.

Because the state metric PS represents the likelihood of transition to each state, if the absolute value of the difference between these state metrics PS is used as the reliability data CF, then this reliability data can represent more accurately the likelihood of the output data y compared to the case where the branch metric is used as the reliability data.

The decoder 26 produces the original voice data DA by using the Viterbi algorithm described above, wherein the convolution-coded data y is converted into a multi-value data according to the reliability data CF and decoding of the voice data DA is carried out by making a soft decision according to the reliability data CF.

In the terminal 1, as described above, the decoding of the voice data DA is performed by making a soft decision based on the reliability data. As a result, it becomes possible to perform more efficient decoding of the voice data DA compared to conventional techniques. It also becomes possible to reduce the bit error rate.

(4) Advantages of Embodiment

In the arrangement described above, the equalizer employs the Viterbi algorithm, and the difference data is detected from the state metrics obtained as the intermediate results during its processing, and the obtained difference data is used as the reliability data. Thus, it becomes possible to readily obtain the reliability data which represents the more accurate likelihood with respect to the output data. By making a soft decision based on this reliability data, it is possible to perform efficient decoding of the voice data DA and it is also possible to reduce the bit error rate.

(5) Other Embodiments

In the embodiment described above, the difference data is directly detected from the state metric obtained by applying the Viterbi algorithm. However, this invention is not only limited to this, but normalization may be performed when the branch metric is produced, and the difference data obtained from the normalized values may be used as the reliability data.

If this technique is used, the metric value varies depending on the amplitude (i.e., energy) of the input data applied to the equalizer 25. In this case, after energy is calculated from a sequence of the input data, the input data can be normalized by dividing the amplitude of each input data by this calculated value. Thus, it becomes possible to further improve the accuracy of the reliability data.

In this case, it is not required to normalize the input data for the calculation of each metric based on the Viterbi algorithm. Therefore, calculation for producing the reliability data may be carried out separately. Alternatively, normalization may be performed by dividing only the reliability data by energy of a sequence of input data.

In the embodiment described above, the number of the states of the convolution-coded data y is set to 32. However, this invention is not only limited to this, but the number of the states may be set to various values as required so as to apply this invention to a wide variety of decoding.

In the embodiment described above, analog-to-digital conversion is performed on I- and Q-signals to produce a word data of IQ data is processed in the equalizer. However, this invention is not only limited to this, for example in the case where a delay circuit is used in a decoding circuit, the convolution-coded data provided by the decoding circuit may be directly applied to the equalizer, which may detect the reliability data by using the Viterbi algorithm.

Furthermore, in the decoding circuit of the embodiment described above, the input data is converted into multi-value data based on the reliability data. However, this invention is not only limited to this, but conversion into multi-value data may be carried out in the equalizer.

In the embodiment described above, the subsequent convolution decoding circuit is composed of the Viterbi decoding circuit. However, this invention is not only limited to this, but various types of convolution decoding circuit may also be used.

In the embodiment described above, the convolution encoding is performed with the encoding ratio of ½. However, this invention is not only limited to this, but various encoding ratios may be used for the convolution encoding.

In the embodiment described above, this invention is applied to a terminal of digital cellular systems, however, this invention is not only limited to this, but may also be applied to a variety of radio communication systems for transmitting convolution-coded data, or to a parity of reproducing systems for decoding desired data, comprising recording transmission path and reproduction transmission path.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A data decoding apparatus for decoding convolution-coded input data which is input via a given wireless transmission medium, comprising;

an equalizer for producing branch metrics from said input data depending on characteristics of said wireless transmission medium, state metrics being produced by summing said branch metric for each of transition paths of said input data, a transition path of said input data being selected based on said state metrics, said equalizer producing output data by performing most likelihood estimation based on said selection result;

a decoding circuit for performing convolution decoding on said output data, wherein;

said equalizer produces difference data between said state metrics as reliability data with respect to said output data; and said equalizer and said decoding circuit perform convolution decoding on said output data by making a soft decision after converting said output data into multi-value data based on said reliability data.

2. A data decoding apparatus according to claim 1, wherein; after eliminating the effects of fading by compensating said input data in response to a change of the characteristics of said transmission medium, said equalizer produces said reliability data as well as said output data.

3. A data decoding apparatus according to claim 2, wherein; said input data is produced by converting a radio frequency incoming signal into a digital value.

4. A data decoding apparatus according to claim 2, wherein; said input data is produced by converting a reproduction signal reproduced from a predetermined recording medium into a digital value.

5. A data decoding apparatus according to claim 2, wherein; said decoding circuit is a Viterbi decoding circuit.

6. A data decoding apparatus according to claim 1, wherein; said input data is produced by converting a radio frequency incoming signal into a digital value.

7. A data decoding apparatus according to claim 1, wherein; said input data is produced by converting a reproduction signal reproduced from a predetermined recording medium into a digital value.

8. A data decoding apparatus according to claim 1, wherein; said decoding circuit is a Viterbi decoding circuit.

9. An equalizer apparatus for equalizing wireless transmitted signal comprising;

a branch metric calculation means for calculating branch metric value from input data depending on characteristics of wireless transmission medium, ACS processing means for producing state metrics by summing said branch metric for each of transition paths of said input data, a state metric memory for memorizing state metric value produced by said ACS processing means, a path memory for memorizing output signals of said ACS processing means, and a most likelihood estimation means for producing output data by performing most likelihood estimation; and means for producing reliability data, wherein said reliability data is the difference between said state metrics with respect to said output data.

10. A radio receiving apparatus for receiving wireless radio wave and decoding convolution-coded received data comprising;

a RF signal processing means for receiving wireless RF signal and producing base band signal including demodulate operation, an equalizer for producing branch metrics from said input data depending on characteristics of said wireless transmission medium, state metrics being produced by summing said branch metric for each of transition paths of said input data, a transition path of said input data being selected based on said state metrics, said equalizer producing output data by performing most likelihood estimation based on said selection result;

a decoding circuit for performing convolution decoding on said output data, wherein;

said equalizer produces difference data between said state metrics as reliability data with respect to said output data; and said equalizer and said decoding circuit perform convolution decoding on said output data by making a soft decision after converting said output data into multi-value data based on said reliability data.

11. A radio receiving apparatus according to claim 10, wherein; after eliminating the effects of fading by compensating said input data in response to a change of the characteristics of said transmission path, said equalizer produces said reliability data as well as said output data.

* * * * *